(12) United States Patent
Daum et al.

(10) Patent No.: US 9,227,845 B2
(45) Date of Patent: Jan. 5, 2016

(54) PACKED TOWER

(75) Inventors: Karl-Heinz Daum, Mainz (DE);
Wolfram Schalk, Bad Homburg (DE)

(73) Assignee: OUTOTEC OYJ, Espoo (FI)

( * ) Notice: Subject to any disclaimer, the term of this patent is extended or adjusted under 35 U.S.C. 154(b) by 147 days.

(21) Appl. No.: 14/343,074

(22) PCT Filed: Aug. 30, 2012

(86) PCT No.: PCT/EP2012/066879
§ 371 (c)(1),
(2), (4) Date: Mar. 6, 2014

(87) PCT Pub. No.: WO2013/034484
PCT Pub. Date: Mar. 14, 2013

(65) Prior Publication Data
US 2014/0239520 A1    Aug. 28, 2014

(30) Foreign Application Priority Data
Sep. 9, 2011 (DE) .......... 10 2011 112 779

(51) Int. Cl.
*B01F 3/04* (2006.01)
*C01B 17/80* (2006.01)
*B01J 10/00* (2006.01)
(Continued)

(52) U.S. Cl.
CPC .......... *C01B 17/806* (2013.01); *B01J 8/0292* (2013.01); *B01J 10/00* (2013.01); *B01J 19/305* (2013.01); *C23C 8/20* (2013.01); *C23C 8/22* (2013.01); *B01J 2208/00884* (2013.01)

(58) Field of Classification Search
CPC ........ B01J 8/0292; B01J 10/00; B01J 19/305; B01J 2208/00884; C01B 17/806; C23C 8/20; C23C 8/22
USPC ..................... 261/97, 110, DIG. 72
See application file for complete search history.

(56) References Cited

U.S. PATENT DOCUMENTS 3,195,987 A * 7/1965 Hardison ............... B01J 8/0492
  210/274
4,275,018 A    6/1981 Braun
(Continued)

FOREIGN PATENT DOCUMENTS

DE    933506 B    9/1955
DE    1684971 A1    4/1971
(Continued)

OTHER PUBLICATIONS

Dittmeyer, et al., "Schwefel und anorganische Schwefelverbindungen", Chemische Technik: Prozesse und Produkte, Dec., 2005, pp. 100-103, vol. 3: Anorganische Grundstoffe Zwischenprodukte, Wiley-VCH Verlag GmbH & Co. KgaA, Weinheim.

*Primary Examiner* — Charles Bushey
(74) *Attorney, Agent, or Firm* — Leydig, Voit & Mayer, Ltd.

(57) ABSTRACT

A packed tower for the absorption of water or $SO_3$ in sulfuric acid includes a jacket and a domed grid disposed within the jacket. The domed grid is held on an L-shaped ring such that a gap is formed between an outside diameter of the domed grid and the jacket. A bed of packings is held on the domed grid through which the sulfuric acid charged from above trickles. A gas supply tube is disposed in a lower region of the tower. A gas outlet is disposed above the bed. An acid outlet is disposed in the lower region of the tower.

12 Claims, 2 Drawing Sheets

(51) Int. Cl.
*B01J 19/30* (2006.01)
*B01J 8/02* (2006.01)
*C23C 8/20* (2006.01)
*C23C 8/22* (2006.01)

(56) References Cited

U.S. PATENT DOCUMENTS

| | | | |
|---|---|---|---|
| 4,543,244 A | 9/1985 | Jones | |
| 4,547,353 A * | 10/1985 | Cameron | C01B 17/88 261/23.1 |
| 4,744,929 A * | 5/1988 | Robinson | B01J 19/305 202/158 |
| 4,747,970 A | 5/1988 | McFarland | |
| 4,814,117 A | 3/1989 | Leva | |
| 5,028,396 A | 7/1991 | Jones | |
| 6,174,510 B1 | 1/2001 | Riano | |

FOREIGN PATENT DOCUMENTS

| | | |
|---|---|---|
| DE | 2526632 C3 | 12/1976 |
| DE | 2945087 A1 | 5/1981 |
| DE | 2924516 A1 | 9/1988 |
| DE | 3929772 A1 | 3/1991 |
| DE | 3320527 C2 | 3/1998 |
| FR | 1570949 A | 6/1969 |

* cited by examiner

PACKED TOWER

CROSS-REFERENCE TO PRIOR APPLICATIONS

This application is a U.S. National Phase application under 35 U.S.C. §371 of International Application No. PCT/EP2012/066879, filed on Aug. 30, 2012, and claims benefit to German Patent Application No. DE 10 2011 112 779.1, filed on Sep. 9, 2011. The International Application was published in English on Mar. 14, 2013 as WO 2013/034484 A2 under PCT Article 21(2).

FIELD

This invention relates to a packed tower, in particular for the absorption of water or $SO_3$ in sulfuric acid, with a bed of packings held on a domed grid through which the sulfuric acid charged from above trickles, with a gas inlet provided in the lower region of the tower, a gas outlet provided above the bed, and an acid outlet provided in the lower region of the tower.

BACKGROUND

The acid part of a sulfuric acid plant comprises the drying of the sulfur-dioxide ($SO_2$)-containing gases and the air as well as the absorption of the sulfur trioxide ($SO_3$) formed in the contact plant for forming the end products sulfuric acid and oleum. The standard configuration for drier and absorber is the packed tower constructed as counterflow apparatus. This upright cylindrical container is divided into three zones. The lower part is formed by the sump with the acid outlet arranged directly above the bottom or also in the bottom and the gas inlet welded into the sheet metal jacket above the acid level. The middle part contains the packed bed on a grid through which the acid, which is uniformly distributed by a sprinkling system located on the bed, trickles downwards. Above the packed bed the acid inlet to the sprinkling system and the gas outlet are located. Packed towers for the most part consist of a cylindrical sheet metal jacket with a multilayer acid-resistant brick lining and with an arched bottom and a grid of acid-resistant ceramic material for accommodating the packed bed. As grid a domed grid with at least 40% free flow cross-section is incorporated, which is suitable for tower diameters up to 15 m. For the packed bed, saddle packings of ceramic material chiefly are chosen, which have large specific surfaces, whereby an intensive mass transfer between acid and gas is given. (cf. Winnacker/Küchler, Chemische Technik: Prozesse und Produkte, edited by Roland Dittmeyer et al, Vol. 3: Anorganische Grundstoffe, Zwischenprodukte, p. 100 ff, Wiley-VCH Verlag Weinheim, 2005.) A corresponding packed tower also is shown for example in DE 33 20 527 C2.

Because of the deteriorating mounting quality of the brick lining, non-brick-lined stainless steel towers of silicon (Si)-containing stainless steel have increasingly been used for many years. It was found that at several points of the packed tower corrosion problems occur due to waste acid (drier) or oleum formed (absorber). Particularly problematic zones are found in the region of the gas inlet or opposite the gas inlet, where the acid film on the tower wall is only thin. Corrosion also occurs at vertical props for the stainless steel grid or below the packed bed on horizontal surfaces on which the acid film also is only thin. Due to the moisture of the gas in the drying tower waste acid is produced, which is highly corrosive and attacks the steel surfaces. In the absorber towers oleum is produced by the $SO_3$ in gas, which likewise is highly corrosive. In the past, this problem has been countered for example in that around the gas inlet a covering plate of silicon-free austenitic stainless steel is provided, which due to the strong corrosion must however regularly be replaced.

SUMMARY

In an embodiment, the present invention provides a packed tower for the absorption of water or SO3 in sulfuric acid. The tower includes a jacket and a domed grid. The domed grid is held on an L-shaped ring such that a gap is formed between an outside diameter of the domed grid and the jacket. A bed of packings is held on the domed grid and configured to have sulfuric acid charged from above trickle therethrough. A gas supply tube is disposed in a lower region of the tower. A gas outlet is disposed above the bed. An acid outlet is disposed in the lower region of the tower.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
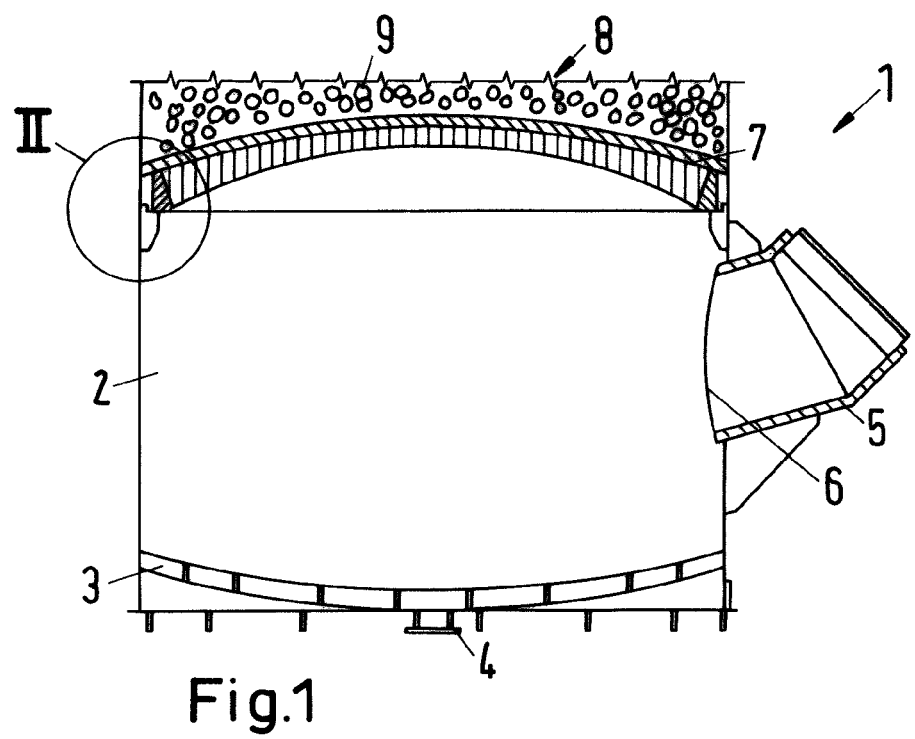
FIG. 1 schematically shows a partial section through a packed tower according to an embodiment of the invention.

In an embodiment, the invention reduces the corrosion in the packed tower of a sulfuric acid plant.

In an embodiment, the invention provides that the domed grid is held on an L-shaped ring such that a gap is formed between the outside diameter of the domed grid and the jacket of the packed tower. In the edge region of the domed grid, the acid thereby is deflected such that it flows through the gap between the L-shaped ring and the jacket of the packed tower and forms a thicker acid film on the wall. As a result, acid-free zones can be avoided, so that in the drying tower no waste acid and in the absorber tower no oleum is formed. The regions of the packed tower susceptible to corrosion are protected by the acid film.

In accordance with a preferred embodiment of the invention, the L-shaped ring has two legs of different materials which preferably are connected with each other by welding. In particular the horizontally arranged leg of the L-shaped ring substantially is made of Si-free stainless steel, which is corrosion-resistant at a sulfuric acid concentration >96% and temperatures up to 150° C. On the other hand, the substantially vertically arranged leg of the L-shaped ring preferably is made of stainless steel with an Si content of 4.5 to 6.5 wt-%, for example of steels with the trade names SX, Saramet or Zecor.

To produce a sufficiently thick acid film on the inner surface of the packed tower, the outside diameter of the L-shaped ring, in accordance with a preferred embodiment of the invention, is smaller than the inside diameter of the packed tower by about 20 to 200 mm, preferably by 50 to 100 mm.

In accordance with an embodiment of the invention, the L-shaped ring rests on vertical supporting plates, which preferably are arranged uniformly distributed around the circumference of the tower and have a distance of 500 to 2500 mm, preferably 1000 to 1500 mm from each other. This ensures a uniform support of the L-shaped ring, wherein the acid film can freely flow down between the supporting plates.

To avoid a corrosion at the supporting plates, the same are made of stainless steel with an Si content of 4.5 to 6.5 wt-%, similar to the vertically arranged leg of the L-shaped ring, in accordance with the invention.

At the gas inlet, the gas supply tube usually is welded into the packed tower and for this purpose slightly protrudes into the tower. Therefore, the acid flowing down along the wall normally is not able to sufficiently wet the region of the tower wall located below the gas supply tube, in order to prevent a corrosion. Other than in the case of the plate provided in the prior art, which must be exchanged regularly, an apron is provided around the lower region of the gas supply tube in accordance with the present invention, which apron includes holes and/or a slot through which acid can pass. The acid flowing down along the wall from above is collected by the apron and joined below the gas supply tube.

If, like in a preferred embodiment of the invention, the apron is inclined upwards from the jacket of the packed tower towards the opening of the gas supply tube and the slot is provided in the region of the apron facing the gas inlet, the acid is collected in the apron and flows over through the slot, so that on the outer wall of the apron and then in the region of the tower wall located below the same a uniform acid film in turn is formed, which prevents a corrosion.

The packed tower 1 according to the present invention, which is schematically shown in FIG. 1, includes a jacket 2 of corrosion-resistant stainless steel sheet and an arched bottom 3 in which an acid outlet 4 is provided. A gas supply tube 5 of a gas inlet 6 opens above the bottom 3. The gas supply tube 5 slightly protrudes into the packed tower 1, so that a sufficient fixation is possible by welding.

Above the gas inlet 6 a domed grid 7 of ceramic material is provided, which carries a bed 8 of likewise ceramic packings 9. In the region of the packed tower, a sprinkling system is provided above the bed 8, via which sulfuric acid is uniformly distributed over the packed bed. In addition, a gas outlet is provided, in order to lead the gas after flowing through the bed 8.

Figure 2:
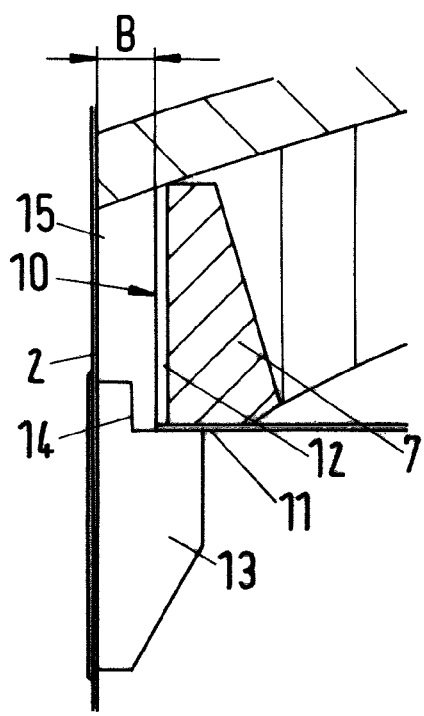
FIG. 2 shows an enlarged view of the section II of FIG. 1 in the region of the support of the domed grid on the wall of the packed tower.

As can, in particular, be taken from FIG. 2, the domed grid 7 is held on an L-shaped ring 10 which extends around the entire circumference of the packed tower 1. The L-shaped ring 10 has a horizontal leg 11 on which the domed grid 7 rests, and a vertical leg 12 against which the domed grid 7 rests. The horizontal leg 11 is made of a corrosion-resistant Si-free stainless steel which is corrosion-resistant at a sulfuric acid concentration >96% and temperatures up to 150° C., e.g. CrNi steel with about 30 wt-% Cr and 60 wt-% Ni. The vertical leg 12 is made of an Si-containing austenitic stainless steel with a silicon content of 4.5 to 6.5 wt-%, for example SX steel, Saramet or Zecor. The legs 11, 12 are welded to each other.

The L-shaped ring 10 rests on a plurality of supporting plates 13 which are uniformly distributed around the circumference of the packed tower 1 and at a tower diameter of for example 10 m each have a distance of 500 to 2000 mm, preferably 1000 to 1500 mm. Like the vertical leg 12, the supporting plates 13 are made of Si-containing stainless steel sheet with a silicon content of 4.5 to 6.5 wt-%.

The supporting plates 13 have a shoulder 14 on which the L-shaped ring 10 rests, which carries the domed grid 7.

Between the L-shaped ring 10 and the jacket 2 of the packed tower 1 a gap 15 extending around the entire circumference of the packed tower 1 is provided, which has a width B of 10 to 100 mm, preferably 20 to 50 mm.

In operation, the sulfuric acid trickling through the packed bed 8 from above is deflected to the outside in the edge region of the domed grid 7, so that it passes through the gap 15 and then flows down along the jacket 2 of the packed tower 1 as a thick sulfuric acid film. The vertically arranged supporting plates 13 like the entire jacket region below the domed grid 7 always lie in the acid stream, so that there is no risk of corrosion.

Figure 3:
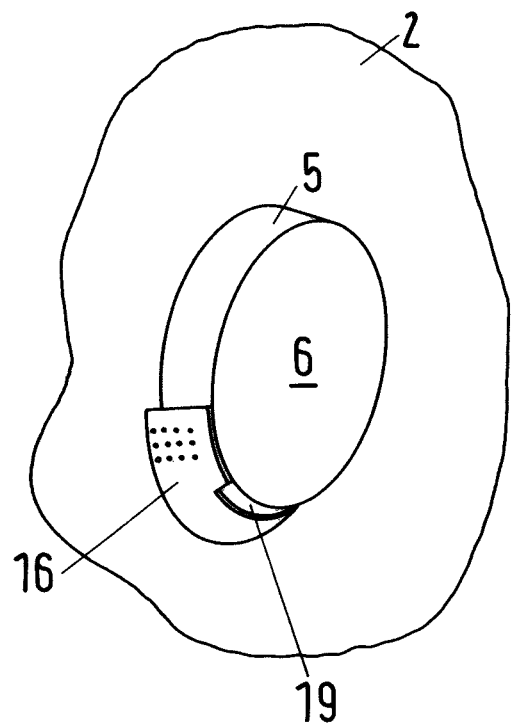
FIG. 3 shows a schematic perspective partial representation of the region of the gas inlet into the packed tower.
Figure 4:
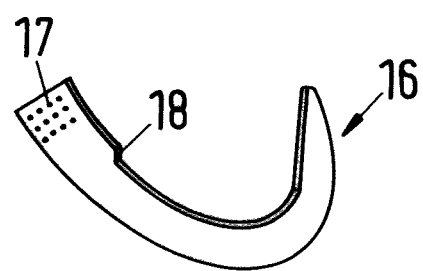
FIG. 4 shows a perspective representation of the apron mounted in FIG. 3.

To prevent that the acid film tears in the region below the gas supply tube 5, an apron 16 is provided in the lower region of the gas supply tube 5 in the embodiment shown in detail in FIG. 3. The apron 16 is welded to the jacket 2 of the packed tower 1 and to the gas supply tube 5, wherein it is inclined such that it rises upwards from the jacket 2 to the gas supply tube 5. In the vertically upper region of the apron 16 a plurality of holes 17 is provided. In addition, a slot 19 is formed by a recessed shoulder of the apron 16 between the gas supply tube 5 and the apron 16.

When the acid now flows down along the wall of the packed tower 1, it is deflected by the gas supply tube 5 protruding into the packed tower 1 and flows into the apron 16, in which it is collected. In the upper, outer region of the apron 16, the acid can again exit directly through the holes 17 and flow off downwards. The remaining acid is collected in the apron 16 and slowly fills the same from below, until the acid flows over through the slot 19 and flows back again as a continuous film along the outside of the apron to the jacket 2 of the packed tower 1 and wets the same completely. In this way, a reliable corrosion protection also can be ensured in this region.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 packed tower
2 jacket 3 bottom
4 acid outlet
5 gas supply tube
6 gas inlet
7 domed grid
8 bed
9 packing
10 L-shaped ring
11 horizontal leg
12 vertical leg
13 supporting plate
14 shoulder
15 gap
16 apron
17 holes
18 shoulder
19 slot
B width of the gap 15

The invention claimed is:

1. A packed tower for the absorption of water or $SO_3$ in sulfuric acid, the packed tower comprising:
   a jacket;
   a domed grid held on an L-shaped ring such that a gap is formed between an outside diameter of the domed grid and the jacket;
   a bed of packings held on the domed grid and configured to have sulfuric acid charged from above trickle therethrough;
   a gas supply tube disposed in a lower region of the tower;
   a gas outlet disposed above the bed; and
   an acid outlet disposed in the lower region of the tower.

2. The packed tower according to claim 1, wherein the L-shaped ring includes two legs of different materials.

3. The packed tower according to claim 2, wherein one of the two legs is a substantially horizontally arranged leg substantially made of Si-free stainless steel.

4. The packed tower according to claim 2, wherein one of the two legs is a substantially vertically arranged leg made of stainless steel with an Si content of 4.5 to 6.5 wt-%.

5. The packed tower according to claim 1, wherein an outside diameter of the L-shaped ring is smaller than an inside diameter of the packed tower by about 20 to 200 mm.

6. The packed tower according claim 1, wherein the L-shaped ring rests on vertical supporting plates.

7. The packed tower according to claim 6, wherein the supporting plates are disposed a distance of 500 to 2500 mm from each other.

8. The packed tower according to claim 6, wherein the supporting plates are made of stainless steel with an Si content of 4.5 to 6.5 wt-%.

9. The packed tower according to claim 1, further comprising an apron disposed around a lower region of the gas supply tube, the apron having at least one of holes and a slot through which the acid can pass.

10. The packed tower according to claim 9, wherein the apron is inclined upwards from the jacket of the packed tower towards an opening of the gas supply tube, and wherein the slot is disposed in a region of the apron facing the gas supply tube.

11. The packed tower according to claim 2, wherein the two legs are connected to each other by a weld.

12. The packed tower according to claim 6, wherein the supporting plates are uniformly distributed around a circumference of the tower.

* * * * *